United States Patent [19]

Cocozza

[11] 4,049,462

[45] Sept. 20, 1977

[54] CHEMICAL FIXATION OF DESULFURIZATION RESIDUES

[75] Inventor: Eugene P. Cocozza, Washingtonville, N.Y.

[73] Assignee: Wehran Engineering Corporation, Middletown, N.Y.

[21] Appl. No.: 657,424

[22] Filed: Feb. 12, 1976

[51] Int. Cl.$^2$ .............................................. C04B 1/00
[52] U.S. Cl. ..................... 106/85; 106/109; 106/110; 106/118; 423/242; 423/244
[58] Field of Search ............... 106/109, 110, 118, 85; 61/35; 423/242, 244

[56] References Cited

U.S. PATENT DOCUMENTS

| 3,159,497 | 12/1964 | Yamaguchi | 106/109 |
|---|---|---|---|
| 3,720,609 | 3/1973 | Smith et al. | 210/59 |
| 3,773,533 | 11/1973 | Omoto et al. | 106/110 |
| 3,785,840 | 1/1974 | Minnick et al. | 106/118 |
| 3,855,391 | 12/1974 | Selmeczi et al. | 423/242 |
| 3,870,535 | 3/1975 | Minnick et al. | 106/118 |
| 3,897,259 | 7/1975 | Nakajima | 106/118 |
| 3,920,795 | 11/1975 | Selmeczi et al. | 106/109 |
| 3,929,964 | 12/1975 | Thoma | 423/242 |

*Primary Examiner*—Patrick P. Garvin
*Assistant Examiner*—John P. Sheehan
*Attorney, Agent, or Firm*—Arthur A. March

[57] ABSTRACT

Chemical fixation of industrial desulfurization residues by forming an intimate admixture of the desulfurization residue, such as a flue gas desulfurization sludge, with an alkaline calcination stack dust, such as a cement kiln dust, in the presence of sufficient water to provide a mass of workable consistency, adjusting the pH of the alkaline mass with acid, such as sulfuric or phosphoric acid, to a value of below about 7, e.g. in the acid range of from below about pH 7 down to about pH 5, and drying the pH adjusted mass to constant weight, preferably after forming the pH adjusted mass into a selectively shaped article, whereby to produce an environmentally stable and leach-resistant hardened solid, cement-like fixed product.

35 Claims, No Drawings

CHEMICAL FIXATION OF DESULFURIZATION RESIDUES

The present invention relates to the chemical fixation of industrial residues, and more particularly to the chemical fixation of industrial desulfurization residues by combining such residues with alkaline calcination stack dust and water, acidifying to an acid pH, and drying the resulting mass to form an optionally selectively shaped, environmentally stable and leach-resistant hardened, solid, fixed product.

Industrial desulfurization residues or sludges are produced on a wide scale as a result of present day auxiliary scrubbing or absorbing processes designed to remove pollutants such as sulfur constituents from air and water discharge effluents of basic manufacturing operations, generally pursuant to air and water pollution control governmental regulation. While these auxiliary scrubbing or absorbing processes may be said to effect the removal of such pollutants to prevent their direct escape into the surrounding environment, the removed pollutants, which are usually in the form of concentrated solid material reaction products constituting industrial sludges or residues, must still be disposed of in a manner which minimizes the chance of immediate indirect escape thereof into the surrounding environment if the overall objectives of such governmental regulation are to be attained. Indeed, improper disposal of such sludges or residues may well undermine these objectives because of the ultimate adverse effect on the environment occasioned thereby. Many of these sludges or residues are so sufficiently rich in these pollutants, consonant with the demands for economically efficient removal procedures, that they may be said to constitute hazardous concentration waste materials necessitating extra precautions in regard to their handling and disposal.

Aside from ocean dumping, which can only be safely used in those special cases where there is little or no adverse environmental impact and which as a practical matter is limited in application to coastal area manufacturing facilities, land disposal is primarily the manner by which industry rids itself of these hazardous and non-hazardous waste materials. Land disposal for instance includes landfilling, lagooning or ponding, abandoned mine filling, and like methods. Of course, any method which contemplates recovery of these waste materials for reuse in some form is to be preferred over disposal per se, depending upon the pertinent practical economical considerations, since not only is the basic environmental impact problem essentially obviated thereby but also a new product is created which would not otherwise have existed.

A natural concomitant of land disposal is that the pollutants and other waste materials in the residue or sludge will eventually find their way back to the surrounding environment. Hence, especially regarding hazardous pollutant type waste materials or residues, i.e. those in which the pollutant constituents are present in high concentrations, the rate of dissipation or migration of the pollutant from the point of landfill or other disposal to the surrounding area must not be greater in time or quantity than an acceptably safe rate for the particular environment in question. Many factors affect such rate including for instance the concentration and form of the particular pollutant, its degree of mobility in the waste residue, and the influence thereon of physical, chemical and/or biological agencies and mechanisms in the adjacent areas. In view of these often imponderable factors, steps must be affirmatively taken to assure that the waste residues in question, particularly in the case of hazardous pollutants such as concentrated desulfurization residues, are rendered more or less innocuous prior to land disposal. Only in this way can avoidance of adverse environmental impact be purposefully attained.

One proposal has been to provide a physical liner between the waste residue and the surrounding land. In addition to the labor and equipment costs for such liner, and possible supplemental adverse environmental impact due to the precursor production of the liner itself and attendant pollution generated as a consequence of such production, in practice the propensity for occurrence of breaks in the liner and in turn leakage of the contents, render such proposal undesirable. Such breaks are not limited to mechanical punctures or rips which might occur during installation or as a result of incorrect disposition of the liner so as to render it vulnerable to local excessive stresses in use, but include as well those due to adverse reactions between potentially active constituents in the residue contents and in the liner itself.

A further proposal involves encapsulation by chemical fixation, whereby similarly to the above physical liner proposal, a chemically produced liner encapsulates portions of the waste residue. The same disadvantages as noted for physical liners are generally applicable in the case of these encapsulating chemical liners as well.

Other proposals involve basic chemical fixation of the waste residue with chemical reagents so that the dissipation or migration of the pollutant constituents from the residue into the surrounding area will be prevented or acceptably retarded. Such chemical reagents may be organic or inorganic substances, all of which are generally designed to change the chemical and physical properties of the waste residue in some way, in order to reduce or eliminate mobility or migration of the pollutant constituents from the residue into the environment. Usually, such fixation is accompanied by a decrease in the surface area to volume ratio of the residue by the solidification of the residue mass, which in turn results in an arresting of pollutant constituent migration in accordance with mass transport phenomena. The latter normally presupposes a leaching liquid diffusion mechanism for the residue which is surface area dependent. Important to such chemical fixation is the extent, if any, or rate of leaching of such pollutant constituents from the chemically fixed residue as a function of time in the particular land disposal environment. The relative cost of such chemical reagents, the relative complexity of the chemical fixation process manipulations and equipment, and the relative degree of attaining leach-resistance in the chemically fixed residue, are factors which generally have rendered these prior proposals unattractive, due to their performance shortcomings from an industrial scale, practical, economical, and efficiency point of view.

It is among the objects of the present invention to overcome the various foregoing disadvantages and drawbacks, and to provide a simple, economical and efficient method for chemical fixation of hazardous and non-hazardous industrial waste residues, and especially industrial desulfurization residues, and to produce thereby an environmentally stable and leach-resistant hardened solid fixed product.

It is among the additional objects of the invention to provide such a method employing a minimum of steps of corresponding minimum duration, a choice of readily available and comparatively inexpensive chemical reagents including waste alkaline calcination stack dust and even spent acid liquor, and involving uncomplicated mixing, shaping and drying containers and economical energy requirements.

It is among the further objects of the invention to provide environmentally stable and leach-resistant hardened solid cement-like fixed composite products having serviceable mechanical structural rigidity and selective article shape, produced by the foregoing method.

Other and still further objects of the invention will become apparent from a study of the within specification and accompanying examples.

It has been found in accordance with the present invention that a simple, economical and efficient method may now be provided for chemical fixation of hazardous and non-hazardous industrial waste residues of the desulfurization type, while simultaneously producing environmentally stable and leach-resistant, optionally shapable, solid fixed products.

In accordance with one embodiment of the invention, a method is provided for chemical fixation of industrial desulfurization residues which comprises intimately admixing the industrial desulfurization residue with alkaline calcination stack dust in the presence of sufficient water to provide a mass of workable consistency, adjusting the pH of the alkaline mass with acid to a value of below about 7, and drying the pH adjusted mass to constant weight. In this manner, an environmentally stable and leach-resistant hardened, solid, fixed product will be produced.

The stack dust is preferably a cement kiln dust or similar argillaceous and calcareous material reagent, which is generally alkaline reacting and contains constituents such as calcium, silicon, aluminum, iron, magensium, sodium, potassium and associated constituents found in cement-making and similar stack dust, for example in the form of oxides and salts. For instance, calcium oxide (lime), calcium carbonate (limestone), calcium sulfate (gypsum), and the like type constituents may be present, all of which might occur as waste products in the stack dust generated during industrial calcination of alkaline materials as in cement making.

The industrial waste residue may be any such residue or sludge as for example is produced in the after-removal of pollutants such as sulfur constituents from the effluent or flue gas of basic manufacturing processes. These manufacturing processes often generate sulfur oxides, e.g. $SO_x$ and especially sulfur dioxide, which must be removed from the reaction effluent by scrubbing or absorbing techniques before venting to the atmosphere in order to avoid environmental pollution. Such manufacturing process may be a fossil fuel consumption reaction, e.g. the burning of oil or coal for producing power or for producing heat for an associated reaction, or an effluent generating reaction, e.g. a cement making or ore roasting reaction in which sulfur constituents are liberated or generated as sulfur oxides, especially sulfur dioxide, during the calcination or roasting. Also, the source of the sulfur constituents might include a combination of both types of reactions, i.e. sulfur in the fossil fuel used to produce heat for a cement type calcination combined with sulfur present in the material being calcined. All of such sources may be considered sulfur constituent containing flue gas sources herein.

In any case, such sulfur constituent containing effluents or flue gases are subject to after-treatment for desulfurization. For instance, the gaseous effluent from such a fossil fuel heated calcination or cement making process can be contacted with an aqueous lime slurry in a rotary kiln to produce calcium-sulfur salts, especially calcium sulfite by scrubbing or absorbing techniques. Even where such after-removal treatment is most efficient, the concentrated content of sulfur constitutents in the slurry must still be disposed of and in such high concentration can represent a hazardous industrial waste residue or sludge. Any such industrial desulfurization residue or sludge is potentially reactive since the absorbed sulfur oxides, especially sulfur oxide, are often unstable and can migrate from the mass and enter the environment. This tendency is advantageously overcome by the present invention.

Generally, any inorganic or mineral acid may be used for adjusting the pH of the mixed wet alkaline mass of desulfurization residue and stack dust to neutralize and acidify such mass. As used herein, inorganic acid and mineral acid are considered interchangeable terms since any acid contributing hydrogen ions to acidify the alkaline content of the wet mass will effectively serve the purpose in question. The nature of the acid anion is not essentially significant so long as operative pH adjustment of the alkaline wet mass is able to be accomplished to change the same to the acid range (below 7). The pH of the final mass must be in the acid range as this is necessary to obtain a solid non-leaching composite product.

Accordingly, sulfuric, phosphoric, hydrochloric, nitric and/or like inorganic or mineral acids are usable herein. Sulfuric acid and phosphoric acid have been found to be particularly advantageous, not only from a cost and source point of view but also because the corresponding anions thereof react with calcium constituents present to form essentially insoluble, inert and leach-resistant substances in the final product. Although any pH below about 7 will suffice for the purposes of the present invention, according to one feature thereof such pH is preferably adjusted to any value in the acid range of from below about 7 down to about 5, e.g. from about 6.9 to about 5.5 or 5 pH, since lowering the pH further merely wastes acid needlessly without apparent additional beneficial effect. In this regard, any acid concentration may be employed, either concentrated, e.g. 10 Normal, or dilute, e.g. 3 to 10% by weight concentration in water, and from any original or waste source. An advantageous source is a spent industrial waste acid liquor such as a spent pickle liquor of about 3–10% concentration. These waste acid liquors are obtainable from various industrial processes such as the pickling of steel and may be preconcentrated by heating, if desired. In any case, the amount of acid required is that amount needed to react with the acid reactive constituents of the desulfurization waste residue and the stack dust to produce a chemical fixation product of acid pH.

The drying step is employed to dry the pH adjusted acid mass to constant weight. This substantially completes and finalizes the chemical fixation. Water removal in this regard can be effected by merely allowing the mass to dry in ambient air. Depending on the nature of the mass and its water content, room temperature or ambient air drying for about 1 to 2 weeks is generally sufficient to achieve water loss to constant weight and a product attaining cement-like hardness. Alternatively, however, accelerated drying can be effected by heating the mass, e.g. at about 100° C. While ambient air drying is simple and avoids the cost of applying heat to the system in this step, the use of applied heat is advantageous in those cases where rapid drying for a considerably reduced period is a more important consideration.

Preferably, the pH adjusted mass is formed into a selectively shaped plastic mass article or object prior to the the drying step. In this way, the dried product will not only be an environmentally stable and leach-resistant hardened or cured solid composite fixed, cement-like product, but advantageously also will constitute a selectively shaped article or object usable as a per se serviceable mechanically rigid structural element as desired. Since the pH adjusted wet plastic mass is easily shapable to conform to the contour of any suitable mold or container, e.g. that used for mixing and pH adjustment, this intervening optional step can be conveniently carried out with a mimimum of effort. The drying step can be effected, with the shaped mass simply situated in the open mold or container of any desired shape, either by way of ambient air drying or by applying drying heat to or through the container walls.

The weight ratio of the desulfurization residue and stack dust to one another may vary over a wide range depending upon the nature of the waste material. For instance, the desulfirization waste residue and stack dust may be present in the weight ratio of about 1 to about 3–4:1, i.e. in the weight ratio range of between about 80:20 to about 50:50. Convenient ratios of about 50:50 are particularly desirable since this enables both waste products to be equally converted into reusable form and thus eliminates their respective disposal problems. However, ratios toward the higher end of the range, i.e. 80:20, are preferred where the desulfirization sludge constitutes the main disposal problem.

Generally, the content of stack dust is believed to contribute calcium oxide and silicate to the mass to improve the hardening or curing of the product and enhance its structural integrity. This inherently also aids in providing a leach-resistant cement-like composite product. Thus, apart from the foregoing, such stack dust may be employed in lesser amounts in terms of the weight ratio range in question where a harder product is desired and the industrial waste residue itself contains a significant content of these hardenable constituents such as calcium oxide, e.g. in calcium hydroxide form in the aqueous lime slurry used for desulfurization of flue gas or the like.

In this regard, while the various mechanisms by which the advantageous results of the present invention are obtained are not fully understood, by way of possible non-limiting explanation, one plausible theory may be that the sulfur constituents in the desulfurization waste residue or sludge are at least in part in the form of calcium sulfite, which upon acidification will be converted to calcium sulfate. Any calcium sulfite contributed by the constituents in the stack dust would be similarly converted. Furthermore, other calcium constituents in the desulfurization waste residue and/or stack dust such as calcium oxide and silicates are believed to be converted under the wet conditions present to hardenable products. Upon drying of the composite intimately mixed mass, and eventual curing or hardening thereof, these hardenable products will harden to final cement-like solid products.

Thus, it is probable that the desulfurization waste residue contributes mainly any calcium sulfate precursor constituents while the stack dust contributes mainly the silicate and other cement-like precursor constituents. Accordingly, the particular weight ratio of the industrial desulfurization waste residue or sludge to the alkaline calcination stack dust in the final analysis will depend on the nature and extent of the calcium, silicon and sulfur constituents, especially oxides and silicates, in the waste residue and the complemental nature and extent of these types of hardenable constituents in the stack dust.

The loaded industrial desulfurization waste residue or flue gas sludge, e.g. which results from scrubbing sulfur oxide type liquid and gaseous effluent in the usual manner, is preferably intimately physically mixed with the alkaline calcination stack dust, e.g. cement kiln dust, in the presence of sufficient overall water content to provide a solids mass of workable consistency, whereupon adjusting the pH with acid to neutralize the alkaline reacting mass and change the same to acid reacting condition, will provide a hardenable chemical fixation mass.

It will be noted that where sulfuric acid is used for the pH adjustment, calcium sulfate will be produced as a by-product from the sulfate anion of the acid used and calcium present in the mixed mass. This generally insoluble gypsum type salt will enhance the cement-like nature of the resulting composite mass system which resists leaching. In the case of phosphoric acid, calcium phosphate will be similarly produced as an insoluble by-product, which will also enhance resistance to leaching. Accordingly, these acids are preferred, although other acids are still usable, such as hydrochloric and nitric since the overall quantity of acid anion contributed salt in the final product is comparatively small whereas sufficient insoluble and cement-like imparting salts and similar argillaceous and calcareous constituents will be overwhelmingly otherwise provided to satisfy the needs of the calcium and other precursors for the calcium sulfate, oxide and silicate and similar cement-like ingredients of the final composite cured or hardened product.

In this latter regard, it will be realized of course, that the industrial desulfurization waste residue or sludge and the industrial alkaline calcination stack dust generally will contain other mineral ingredients similarly beneficial to the hardness, structural rigidity and leach-resistant qualities desired, such as silicon, aluminum, magnesium, iron, etc., oxides, and the like, and various impurities normally found in cement clinker material or the like, and in cement calcination stack dust, fly ash or the like, as the case may be. Other constituents such as sodium and potassium oxides will often also be present. Additionally, impurities such as cadmium may find their way into the desulfurization sludge from the fossil fuel used in the basic manufacturing operation.

The amount of water present in the system may vary over a wide range, depending upon the amount needed to reduce the viscosity of and provide a workable consistency for the particular weight ratio mixture of the waste residue and stack dust, considering the normally fine-grained or silt-like quality of the raw waste residue and the normally powder-like quality of the raw stack dust. This water may be contributed at least in part by the moisture content of the starting waste residue or sludge, e.g. an aqueous lime slurry sludge containing sulfur oxides such as sulfur dioxide in absorbed condition in high concentration therein, and/or by the aqueous content or extent of diluteness of the treating acid used for pH adjustment. Generally, the overall water content of the system may amount to between about 10 to 95% by weight based on the combined weight of the solids content of the desulfurization waste residue and stack dust.

Where the waste residue is a comparatively dry or moisture-deficient material and/or the acid used is in concentrated form, e.g. 10 Normal, the water content will be provided primarily by addition of extraneous water in the necessary amount. Such amount will be that needed to achieve a workable consistency for readily mixing and blending waste residue, stack dust and acid components, to effect adjustment of the pH of the composite mass to within the acid range, i.e. below about 7, and to permit the pH adjusted mass to be selectively shaped or molded, or to take the shape of its container, optionally prior to the drying step. Naturally, the amount of water will be desirably no more than that required for the above purposes as excess water will add to the drying time, and in the case of accelerated drying by applying heat to the system will correspondingly increase the amount of energy needed to provide such heat. The amount of water added thus regulates the percentage of total solids in the final composite mass and concomitantly the extent of drying needed to achieve constant weight.

The various components can be intermixed and contacted in sequence or in alternate increments as is convenient. Desirably, the stack dust and water components are added in alternate successive increments or batches to the waste residue or sludge component to facilitate uniformity of mixing, whereupon the acid component is added in successive increments to the resulting wet plastic mass to effect neutralization and consonant shift to the acid pH range. Appropriate agitation by stirring or the like is undertaken to achieve concurrent mixing of the components during these addition steps. Where the waste residue or sludge component contains sufficient water component at the start, the stack dust component need merely be added, preferably in successive increments, with attendant agitation. Any water not provided for in the waste residue or sludge component, or by independent addition, is concomitantly compensated for by including the same with or in the acid component. For this purpose, the acid may be used in dilute aqueous form or more concentrated acid may be diluted with any necessary water content prior to acid addition.

In accordance with one embodiment, the pH is adjusted by adding sulfuric acid in an amount of between about 12 to 20% by weight $H_2SO_4$ based on the combined weight of the waste residue and stack dust, or by adding phosphoric acid in an amount of between about 2 to 7% by weight $H_3PO_4$ based on the combined weight of said residue and dust, for example as the case may be with the waste residue and stack dust being present in the weight ratio of about 50:50, i.e. in about equal amounts, and correspondingly for example with the water being present in an amount of between about 10 to 95% by weight based on the combined weight of said residue and dust.

A further feature of the present invention concerns the fact that during the pH adjustment, whether by acid addition in sequence after admixing the waste residue with the stack dust and water or in alternate successive increments with the addition of the other components, a considerable amount of heat is generated. To permit such heat to be distributed and dissipated, such agitation is desirable as well as incremental acid addition. Nevertheless, the neutralization heat so generated can be advantageously recovered by appropriate means for use in other processes as the artisan will appreciate. In terms of industrial scale operations, such generated heat, e.g. in closed pH adjustment systems and apparatus, can be recovered for use in the subsequent drying of the acidified chemical fixation product itself. Since the neutralization which occurs during the pH adjustment also causes carbon dioxide liberation, i.e. mainly from limestone constituents present, this gas may be recovered as well, especially in industrial scale operations, as an economic by-product.

Advantageously, therefore, the present invention provides for the chemical fixation of hazardous and non-hazardous raw industrial waste residues, including flue gas desulfurization sludges in particular, to produce environmentally stable and leach-resistant solid fixed composite products readily adapted for safe land disposal, e.g. in landfills, without adverse environmental impact or pollution, or for use per se as structural materials or articles of optionally selective shape and practical mechanical rigidity. This is accomplished with the concurrent disposal along with the desulfurization waste residue, of large corresponding quantities of other waste materials representing the other components of the system, including stack dust, especially raw cement kiln dust (approximately 4.5 million tons of which are generated annually in the United States), and various industrial waste acids of many types and concentrations. Thus, not only is an environmentally beneficial invention involved, but the method can be practiced entirely with nuisance type and often difficultly disposable waste materials which constitute inexpensive starting materials in readily available abundant supply, while employing a minimum of steps and manipulations, as well as inexpensive and simple reaction or treatment equipment of almost negligible energy consumption, and in a manner free from production of by-products except carbon dioxide liberated during pH adjustment and water lost during drying of the chemical fixation composite product beneficially produced.

The following typical examples of the concept of the present invention are set forth by way of illustration and not limitation, all parts herein being parts by weight unless otherwise apparent or specifically indicated.

EXAMPLE 1

Eastern Coal Lime Sludge

| Composition: | Sludge | Stack Dust | $H_2SO_4$ | $H_2O$ |
|---|---|---|---|---|
| Grams | 100 | 100 | 24.7 | 129 |
| % by Wt. | 28.4 | 28.4 | 7.0 | 36.2 |

To 100g. alkaline $SO_2$ scrubber sludge (about 40% total solids) obtained from eastern coal lime process flue gas desulfurization, are alternately added 100g. alkaline calcination stack dust in the form of cement kiln dust in approximately 10g. increments and 93 ml. $H_2O$ in approximately 9 ml. increments, while stirring the wet mass.

To the resulting intimate wet solids mixture of workable consistency are then added, with continued stirring, 50 ml. of 10 N $H_2SO_4$ in approximately 5 ml. increments, allowing effervescence ($CO_2$) to subside between the acid increment additions. Heat is generated during the acid addition, indicating that the initial alkaline reacting solids mixture is being neutralized. The amount of acid added is sufficient to adjust the pH to the acid range. The pH of the final smooth, viscous chemical fixation mixture is approximately 6.7.

The 10 N $H_2SO_4$ is prepared by adding 278 ml. of 96% conc. $H_2SO_4$ (about 1762 g/l) to water, and diluting to 1000 ml. to provide a final concentration of approximately 493 g/l $H_2SO_4$. The 50 ml. of acid used include 24.7 g. $H_2SO_4$ (gram equivalent weight = 49 g) and 36 g. $H_2O$. Based on the combined weight of the sludge and stack dust solids components, the amount of water component added is about 64.5% by weight and the amount of dibasic acid component added is about 12.3% by weight.

The chemical fixation mixture is allowed to dry in ambient air at room temperature to constant weight. This step takes approximately 22 days to reach equilibrium, and results in a cumulative weight loss of about 51.5%, although the product attains hardness after only 7 days of drying. The mixture upon drying will be molded in the shape of the container in which it is held. The so-produced chemically fixed composite article constitutes an environmentally stable and leach resistant hardened solid cement-like product having serviceable mechanical structural rigidity and a selective article shape.

A 100 g. sample of the air dried solid product, produced according to the above procedure, is leached after drying for 33 days, by contact at room temperature with 500 ml. distilled water. The sample is placed in a plastic container and the water is poured down the container wall to avoid disturbance of the sample. After reaching equilibrium as determined by stabilization of pH and maximum specific conductance, the leachate is discarded and successive releaching by contact in each instance with a fresh 500 ml. quantity of distilled water is undertaken. No disintegration occurs on leaching and the leachate progressively exhibits an environmentally acceptable low specific conductance (in micromhos/cm, 25° C.) as shown in Table 1, indicating minimal loss of pollutant constituent residue into the leachate, after a total of 33 days of drying and thereafter 15 days of cumulative leaching.

EXAMPLE 2

Eastern Coal Lime Sludge

| Composition: | Sludge | Stack Dust | $H_3PO_4$ | $H_2O$ |
|---|---|---|---|---|
| Grams | 100 | 100 | 9.9 | 50 |
| % by wt. | 38.5 | 38.5 | 3.8 | 19.2 |

The procedure of Example 1 is repeated but in this case adding 20 ml. $H_2O$ in approximately 2 ml. increments alternately with the stack dust 10 g. increments to the same type sludge as in Example 1 and then adding 37 ml. of 10 N $H_3PO_4$ in approximately 5 ml. increments to the resulting solids mixture, while allowing effervescence to subside between the acid increment additions. The same essential results are obtained. The pH of the final smooth, viscous chemical fixation mixture is approximately 6.4.

The 10 N $H_3PO_4$ is prepared by adding 185 ml. of 85% conc. $H_3PO_4$ (about 1445 g/l) to water, and diluting to 1000 ml. to provide a final concentration of approximately 268 g/l $H_3PO_4$. The 37 ml. of acid used include 9.9 g. $H_3PO_4$ (gram equivalent weight = 32.7 g.) and 30 g. $H_2O$. Based on the combined weight of the sludge and stack dust components, the amount of water component added is about 25% by weight and the amount of tribasic acid component added is about 5% by weight.

The drying step takes approximately 24 days to reach equilibrium and results in a cumulative weight loss of about 38.8%, although the product attains hardness after only 6 days of drying. The drying step provides a chemically fixed composite article of the same type as described in Example 1.

Upon leaching a 100 g. sample of the air dried solid product, produced according to the above procedure, after drying for 31 days, the same beneficial results are obtained following the leaching procedure of Example 1. No disintegration occurs on leaching and the leachate has an environmentally acceptable similarly low specific conductance, as shown in Table 1 below, after a total of 31 days of drying and thereafter 33 days of cumulative leaching.

EXAMPLE 3

Eastern Coal Limestone Sludge

| Composition: | Sludge | Stack Dust | $H_2SO_4$ | $H_2O$ |
|---|---|---|---|---|
| Grams | 100 | 100 | 37 | 94 |
| % by Wt. | 30.2 | 30.2 | 11.2 | 28.4 |

The procedure of Example 1 is repeated, but in this case starting with 100 g. alkaline $SO_2$ scrubber sludge (about 23% total solids) obtained from eastern coal limestone process flue gas desulfurization, adding 40 ml. $H_2O$ in approximately 4 ml. increments alternately with the stack dust 10 g. increments, and then adding 75 ml. of 10 N $H_2SO_4$ in approximately 8 ml. increments to the resulting solids mixture, while allowing effervescence to subside between the acid increment additions. The same essential results are obtained. The pH of the final smooth, viscous chemical fixation mixture is approximately 6.6.

The 75 ml. of acid used include 37 g. $H_2SO_4$ and 54 g. $H_2O$. Based on the combined weight of the sludge and stack dust components, the amount of water component added is about 47% by weight and the amount of dibasic acid component added is about 18.5% by weight.

The drying step takes approximately 21 days to reach equilibrium and results in a cumulative weight loss of about 54.9%, although the product attains hardness after only 7 days of drying. The drying step provides a chemically fixed composite article of the same type as described in Example 1.

Upon leaching a 100 g. sample of the air dried solid product, produced according to the above procedure, after drying for 22 days, the same beneficial results are obtained following the leaching procedure of Example 1. No disintegration occurs on leaching and the leachate has an environmentally acceptable similarly low specific conductance, as shown in Table 1 below, after a total of 22 days of drying and thereafter 32 days of cumulative leaching.

EXAMPLE 4

Eastern Coal Limestone Sludge

| Composition: | Sludge | Stack Dust | H₃PO₄ | H₂O |
|---|---|---|---|---|
| Grams | 100 | 100 | 7.5 | 23 |
| % by Wt. | 43.4 | 43.4 | 3.3 | 9.9 |

The procedure of Example 2 is repeated, but in this case starting with 100 g alkaline SO₂ scrubber sludge obtained from eastern coal limestone process flue gas desulfurization as in Example 3, and alternately adding 28 ml. of 10 N H₃PO₄ in approximately 3 ml. increments with the stack dust 10 g increments, with appropriate stirring of the resulting incremental solids mixture and while allowing effervescence to subside between the acid increment alternate additions. The same essential results are obtained even though no water is separately added to the system. The pH of the final smooth, viscous chemical fixation mixture is approximately 6.6.

The 28 ml. of acid used include 7.5 g H₃PO₄ and 23 g H₂O. Based on the combined weight of the sludge and stack dust components, the amount of water component added is about 11.5% by weight and the amount of tribasic acid component added is about 3.75% by weight.

The drying step takes approximately 27 days to reach equilibrium and results in a cumulative weight loss of about 46.8%, although the product attains hardness after only 7 days of drying. The drying step provides a chemically fixed composite product of the same type as described in Example 1.

Upon leaching a 100 g sample of the air dried solid product, produced according to the above procedure, after drying for 31 days, the same beneficial results are obtained following the leaching procedure of Example 1. No disintegration occurs on leaching and the leachate has an environmentally acceptable similarly low specific conductance, as shown in Table 1 below, after a total of 31 days of drying and thereafter 43 days of cumulative leaching.

EXAMPLE 5

Eastern Coal Double Alkali Sludge

| Composition: | Sludge | Stack Dust | H₂SO₄ | H₂O |
|---|---|---|---|---|
| Grams | 100 | 100 | 39 | 187 |
| % by Wt. | 23.5 | 23.5 | 9.2 | 43.8 |

The procedure of Example 1 is repeated, but in this case starting with 100 g SO₂ scrubber sludge (about 37% total solids) obtained from eastern coal double alkali process flue gas desulfurization, adding 130 ml. H₂O in approximately 13 ml. increments alternately with the stack dust 10 g increments, and then adding 79 ml. of 10 N H₂SO₄ in approximately 8 ml. increments to the resulting solids mixture, while allowing effervescence to subside between the acid increment additions. The same essential results are obtained. The pH of the final smooth, viscous chemical fixation mixture is approximately 6.8.

The 79 ml. of acid used include 39 g H₂SO₄ and 57 g H₂O. Based on the combined weight of the sludge and stack dust components, the amount of water component added is about 93.5% by weight and the amount of dibasic acid component added is about 19.5% by weight.

The drying step takes approximately 20 days to reach equilibrium and results in a cumulative weight loss of about 55.4%, although the product attains hardness after only 7 days of drying. The drying step provides a chemically fixed composite article of the same type as described in Example 1.

Upon leaching a 100 g sample of the air dried solid product, produced according to the above procedure, after drying for 21 days, the same beneficial results are obtained following the leaching procedure of Example 1. No disintegration occurs on leaching and the leachate has an environmentally acceptable similarly low specific conductance, as shown in Table 1 below, after a total of 21 ays of drying and thereafter 29 days of cumulative leaching.

EXAMPLE 6

Western Coal Limestone Sludge

| Composition: | Sludge | Stack Dust | H₂SO₄ | H₂O |
|---|---|---|---|---|
| Grams | 100 | 100 | 32.6 | 183 |
| % by Wt. | 24.1 | 24.1 | 7.8 | 44.0 |

The procedure of Example 1 is repeated, but in this case starting with 100 g alkaline SO₂ scrubber sludge (about 14% total solids) obtained from western coal limestone process flue gas desulfurization, adding 135 ml. H₂O in approximately 15 ml. increments alternately with the stack dust 10 g increments, and then adding 66 ml. of 10 N H₂SO₄ in approximately 5 ml. increments to the resulting solids mixture, while allowing effervescence to subside between the acid increment additions. The same essential results are obtained. The pH of the final smooth, viscous chemical fixation mixture is approximately 6.7

The 66 ml. of acid used include 32.6 g H₂SO₄ and 48 g H₂O. Based on the combined weight of the sludge and stack dust components, the amount of water component added is about 91.5% by weight and the amount of dibasic acid component added is about 16.3% by weight.

The drying step takes approximately 28 days to reach equilibrium and results in a cumulative weight loss of about 52.9%, although the product attains hardness after only 11 days of drying. The drying step provides a chemically fixed composite article of the same type as described in Example 1.

Upon leaching a 100 g sample of the air dried solid product, produced according to the above procedure, after drying for 32 days, the same beneficial results are obtained following the leaching procedure of Example 1. No disintegration occurs on leaching and the leachate has an environmentally acceptable similarly low specific conductance, as shown in Table 1 below, after a total of 32 days of drying and thereafter 13 days of cumulative leaching.

EXAMPLE 7

Western Coal Limestone Sludge

| Composition: | Sludge | Stack Dust | H₃PO₄ | H₂O |
|---|---|---|---|---|
| Grams | 100 | 100 | 13.9 | 92 |
| % by Wt. | 32.8 | 32.8 | 4.6 | 29.8 |

The procedure of Example 2 is repeated, but in this case starting with 100 g alkaline $SO_2$ scrubber sludge obtained from western coal limestone process flue gas desulfurization as in Example 6, adding 50 ml. $H_2O$ in approximately 5 ml. increments alternately with the stack dust 10 g increments, and then adding 52 ml. of 10 N $H_3PO_3$ in approximately 5 ml. increments to the resulting solids mixture, while allowing effervescence to subside between the acid increment additions. The same essential results are obtained. The pH of the final smooth, viscous chemical fixation mixture is approximately 6.7.

The 52 ml. of acid used include 13.9 g $H_3PO_4$ and 42 g $H_2O$. Based on the combined weight of the sludge and stack dust components, the amount of water component added is about 46% by weight and the amount of tribasic acid component added is about 7% by weight.

The drying step takes approximately 26 days to reach equilibrium and results in a cumulative weight loss of about 40.3%, although the product attains hardness after only 7 days of drying. The drying step provides a chemically fixed composite product of the same type as described in Example 1.

Upon leaching a 100 g sample of the air dried solid product, produced according to the above procedure, after drying for 46 days, the same beneficial results are obtained following the leaching procedure of Example 1. No disintegration occurs on leaching and the leachate has an environmentally acceptable similarly low specific conductance, as shown in Table 1 below, after a total of 46 days of drying and thereafter 38 days of cumulative leaching.

EXAMPLE 8

Western Coal Double Alkali Sludge

| Composition: | Sludge | Stack Dust | $H_2SO_4$ | $H_2O$ |
|---|---|---|---|---|
| Grams | 100 | 100 | 28.1 | 136 |
| % by Wt. | 27.5 | 27.5 | 7.7 | 37.3 |

The procedure of Example 1 is repeated, but in this case starting with 100 g alkaline $SO_2$ scrubber sludge (about 44% total solids) obtained from western coal double alkali process flue gas desulfurization, adding 95 ml. $H_2O$ in approximately 10 ml. increments alternately with the stack dust 10 g increments, and then adding 57 ml. of 10 N $H_2SO_4$ in approximately 5 ml. increments to the resulting solids mixture, while allowing effervescence to subside between the acid increment additions. The same essential results are obtained. The pH of the final smooth, viscous chemical fixation mixture is approximately 6.7.

The 57 ml. of acid used include 28.1 g $H_2SO_4$ and 41 g $H_2O$. Based on the combined weight of the sludge and stack dust components, the amount of water component added is about 68% by weight and the amount of dibasic acid component added is about 14% by weight.

The drying step takes approximately 22 days to reach equilibrium and results in a cumulative weight loss of about 60.3%, although the product attains hardness after only 11 days of drying. The drying step provides a chemically fixed composite article of the same type as described in Example 1.

Upon leaching a 100 g sample of the air dried solid product, produced according to the above procedure, after drying for 32 days, the same beneficial results are obtained following the leaching procedure of Example 1. No disintegration occurs on leaching and the leachate has an environmentally acceptable similarly low specific conductance, as shown in Table 1 below, after a total of 32 days of drying and thereafter 15 days of cumulative leaching.

EXAMPLE 9

Western Coal Double Alkali Sludge

| Composition: | Sludge | Stack Dust | $H_3PO_4$ | $H_2O$ |
|---|---|---|---|---|
| Grams | 100 | 100 | 4.6 | 14 |
| % by Wt. | 45.8 | 45.8 | 2.1 | 6.3 |

The procedure of Example 2 is repeated, but in this case starting with 100 g alkaline $SO_2$ scrubber sludge obtained from western coal double alkali process flue gas desulfurization as in Example 8, and alternately adding 17 ml. of 10 N $H_3PO_4$ in approximately 2 ml. increments with the stack dust 10 g as in Example 4, with appropriate stirring of the resulting incremental solids mixture and while allowing effervescence to subside between the acid increment alternate additions. The same essential results are obtained even though no water is separately added to the system. The pH of the final smooth, viscous chemical fixation mixture is approximately 6.4.

The 17 ml. of acid used include 4.6 g $H_3PO_4$ and 14 g $H_2O$. Based on the combined weight of the sludge and stack dust components, the amount of water component added is about 7% by weight and the amount of tribasic acid component added is about 2.3% by weight.

The drying step takes approximately 22 days to reach equilibrium and results in a cumulative weight loss of about 43.1%, although the product attains hardness after only 13 days of drying. The drying step provides a chemically fixed composite product of the same type as described in Example 1.

Upon leaching a 100 g sample of the air dried solid product, produced according to the above procedure, after drying for 26 days, the same beneficial results are obtained following the leaching procedure of Example 1. No disintegration occurs on leaching and the leachate has an environmentally acceptable similarly low specific conductance, as shown in Table 1 below, after a total of 26 days of drying and thereafter 45 days of cumulative leaching.

TABLE 1

$H_2O$ LEACH EQUILIBRIUM

| | Leach No. | Duration In Days | Leachate pH | Specific Conductance in micromhos/cm 25° C |
|---|---|---|---|---|
| Ex. 1 | 1 | 5 | 8.3 | 9500 |
| | 2 | 3 | 8.1 | 2910 |
| | 3 | 7 | 8.0 | 2410 |
| Ex. 2 | 1 | 7 | 7.8 | 10000 |
| | 2 | 9 | 7.7 | 3400 |
| | 3 | 7 | 7.7 | 2000 |
| | 4 | 10 | 7.7 | 1770 |
| Ex. 3 | 1 | 10 | 8.2 | 8700 |
| | 2 | 12 | 8.1 | 3150 |
| | 3 | 10 | 7.9 | 2390 |
| Ex. 4 | 1 | 5 | 7.8 | 13000 |
| | 2 | 7 | 7.7 | 3650 |
| | 3 | 14 | 7.7 | 2500 |
| | 4 | 7 | 7.8 | 1390 |
| | 5 | 10 | 7.8 | 1380 |
| Ex. 5 | 1 | 6 | 8.6 | 11000 |
| | 2 | 13 | 8.2 | 3280 |
| | 3 | 10 | 8.1 | 2450 |
| Ex. 6 | 1 | 5 | 8.5 | 12500 |
| | 2 | 4 | 8.1 | 3250 |
| | 3 | 4 | 8.0 | 2400 |
| Ex. 7 | 1 | 4 | 7.8 | 13000 |
| | 2 | 6 | 7.7 | 4400 |
| | 3 | 6 | 7.7 | 2520 |

TABLE 1-continued
H₂O LEACH EQUILIBRIUM

|  | Leach No. | Duration In Days | Leachate pH | Specific Conductance in micromhos/cm 25° C |
|---|---|---|---|---|
|  | 4 | 9 | 7.6 | 2270 |
|  | 5 | 5 | 7.7 | 1740 |
|  | 6 | 8 | 7.7 | 1975 |
| Ex. 8 | 1 | 7 | 8.1 | 12000 |
|  | 2 | 4 | 8.0 | 3200 |
|  | 3 | 4 | 7.9 | 2350 |
| Ex. 9 | 1 | 5 | 8.1 | 15000 |
|  | 2 | 6 | 7.9 | 3570 |
|  | 3 | 11 | 7.8 | 2650 |
|  | 4 | 6 | 7.9 | 1950 |
|  | 5 | 7 | 7.8 | 1730 |
|  | 6 | 10 | 7.9 | 1700 |

EXAMPLE 10

Sludge specimens correspondingly chemically fixed according to the procedures of Examples 1 to 9 were cured or dried to constant weight (20 to 30 days) and then leached by contact with deionized water for 72 hours. The conductivity was periodically measured during the leaching process and reached equilibrium value after 24 hours. The results as set forth in Table 2 below indicate the beneficial environmentally stable and leach-resistant nature of the hardened solid composite chemically fixed products obtainable according to the present invention. The cadmium content (in micrograms) is traceable to the fossil fuel (coal) used in the basic manufacturing process that generates the effluent with respect to which desulfurization is required.

TABLE 2
LEACHATE DATA

| Type Sludge | Type Acid | Calcium mg/l | Sulfate mg/l | Cadmium ug/l | Specimen Weight g |
|---|---|---|---|---|---|
| Ex. 1 | H₂SO₄ | 500 | 3520 | 0.8 | 160 |
| Ex. 2 | H₃PO₄ | 490 | 2400 | 1.1 | 143 |
| Ex. 3 | H₂SO₄ | 380 | 1760 | 1.8 | 140 |
| Ex. 4 | H₃PO₄ | 490 | 3850 | 2.6 | 118 |
| Ex. 5 | H₂SO₄ | 510 | 4400 | 3.8 | 164 |
| Ex. 6 | H₂SO₄ | 470 | 3750 | 5.0 | 129 |
| Ex. 7 | H₃PO₄ | 510 | 3960 | 3.3 | 130 |
| Ex. 8 | H₂SO₄ | 500 | 7000 | 5.5 | 161 |
| Ex. 9 | H₃PO₄ | 450 | 6000 | 6.0 | 146 |

EXAMPLE 11

The procedure of Examples 1 to 9 is repeated respectively, except that in each instance instead of air drying the chemical fixation product the same is dried by applying heat thereto to accelerate the drying and curing procedure. For this purpose, the product is heated at about 100° C and the drying time is correspondingly considerably reduced.

As contemplated in the examples, the eastern coal lime sludge is an $SO_x$ scrubber sludge, i.e. of unknown sulfur-oxygen ratio content, which contains about 40% total solids including calcium, sulfate and sulfite as major contaminants, with the presence of the additional elements Sr, Mn, Na and Cd as well as Mg, Cr, Hg, Ni and Zn also being indicated. In the same way, the eastern coal limestone sludge is an $SO_x$ scrubber sludge which contains about 23% total solids including calcium, sulfate and sulfite as major contaminants, with the presence of the additional elements Zn, Si, Mg, Fe, Al, Cr and Sr as well as Be, Cu, Hg, Mn and Ni also being indicated. In turn, the eastern coal double alkali sludge is an $SO_x$ scrubber sludge which contains about 37% total solids including sodium, calcium, sulfate and sulfite as major contaminants, with the presence of the additional elements Sn, Cr, Si, B, Zn, Mn, Fe, Sb, Pb, Ti and Mg as well as Be, Hg, Ni and Zn also being indicated. Correspondingly, the western coal limestone sludge is an $SO_x$ scrubber sludge which contains about 14% total solids including calcium, sulfate and sulfite as major contaminants, with the presence of the additional elements Si, Mg, Fe, Al, Cr and Sr as well as Be, Cu, Hg, Mn, Ni and Zn also being indicated. Lastly, the western coal double alkali sludge is an $SO_x$ scrubber sludge which contains about 44% total solids including calcium, sodium, sulfate and sulfite as major contaminants, with the presence of the additional elements B, Si, Hg, Fe, Mg, Pb, Zn, Cu, Ti, Cr, Sr, Be as well as Mn and Ni also being indicated.

The stack dust or kiln dust in this same regard has a general make-up roughly 14 -16% $SiO_2$, 3.5–4% $Al_2O_3$, 2.5–3% $Fe_2O_3$, 45–53% CaO, 0.5–1% MgO, and total sulfur and alkalies of roughly 9-15.5% $SO_3$, 4% $K_2O$ and 0.5% $Na_2O$, with the remainder correspondingly representing a loss on ignition content of about 9–19%. On an ignited basis these analysis values are roughly 17–17.5% $SiO_2$, 3–4.5% $Al_2O_3$, 3–4.5% $Fe_2O_3$, 53–59% CaO, 0.5–1% MgO, 10–17% $SO_3$, 4–5% $K_2O$ and 0.5–0.6% $Na_2O$.

Specific type calcium and silicate containing cement kiln dusts typically usable herein, with ingredients noted in percent by weight for each specimen both before and after analysis ignition, are set forth in Table 3 below, the first set of values relating to the specimen as received and the second set of values (in parentheses) relating to the specimen on an ignited basis:

TABLE 3
Kiln Dust Analysis

| Constituent | Specimen 1 | Specimen 2 | Specimen 3 | Specimen 4 |
|---|---|---|---|---|
| $SiO_2$ | 15.7 (17.6) | 14.2 (17.4) | 15.9 (17.4) | 15.8 (17.2) |
| $Al_2O_3$ | 3.7 ( 4.1) | 3.6 ( 3.2) | 4.0 ( 4.3) | 4.2 ( 4.6) |
| $Fe_2O_3$ | 2.7 ( 3.0) | 2.6 ( 4.6) | 3.1 ( 3.4) | 2.8 ( 3.1) |
| CaO | 52.6 (58.8) | 45.9 (56.6) | 48.8 (53.4) | 48.7 (53.3) |
| MgO | 0.68 ( 0.76) | 0.81 ( 1.0) | 0.49 ( 0.54) | 0.54 ( 0.59) |
| $SO_3$* | 9.3 (10.4) | 9.6 (11.8) | 15.1 (16.6) | 15.4 (16.8) |
| $K_2O$* | 4.2 ( 4.8) | 3.9 ( 4.7) | 4.0 ( 4.4) | 3.9 ( 4.3) |
| $Na_2O$* | 0.55 ( 0.62) | 0.50 ( 0.62) | 0.50 ( 0.55) | 0.50 (0.55) |
| Loss | 10.1 — | 18.8 — | 8.7 — | 8.7 — |
| Total Before | 99.53 | 100.10 | 100.59 | 100.54 |
| After | (100.08) | (99.92) | (100.59) | (100.44) |

*Total sulfurs and alkalies

It will be appreciated that the foregoing specification and examples are set forth by way of illustration and not limitation, and that various modifications and changes may be made therein without departing from the spirit and scope of the present invention which is to be limited solely by the scope of the appended claims:

What is claimed is:

1. Method for the chemical fixation of industrial desulfurization residues containing calcium and sulfur which result from the sulfur constituent removal treatment of gaseous effluent of basic manufacturing processes which comprises:

admixing said desulfurization residues with an alkaline argillaceous and calcarious calcination stack dust and adjusting the pH of the resulting admixture with an inorganic acid to a value in the acid pH range below 7 in the presence of sufficient water to provide a mass of workable consistency, and;

drying the pH adjusted mass to constant weight to produce an enviornmentally stable and leach resistant hardened solid product.

2. Method according to claim 1 wherein said stack dust is a calcium and silicate containing cement kiln dust.

3. Method according to claim 1 wherein said desulfurization residue is a flue gas desulfurization sludge.

4. Method according to claim 1 wherein said acid is sulfuric acid.

5. Method according to claim 1 wherein said acid is phosphoric acid.

6. Method according to claim 1 wherein said acid is an inorganic acid selected from the group consisting of sulfuric, phosphoric, hydrochloric and nitric acids.

7. Method according to claim 1 wherein said drying is carried out by ambient air drying for about 1 to 2 weeks.

8. Method according to claim 1 wherein the pH is adjusted to a value in the acid range of from below 7 down to about 5.

9. Method according to claim 1 wherein said desulfurization residue and said dust are present in the weight ratio range of about 80:20 to 50:50.

10. Method according to claim 1 wherein said desulfurization residue and said dust are present in the weight ratio of about 50:50.

11. Method according to claim 1 wherein said water is present in an amount of about 10 to 95% by weight based on the combined weight of said desulfurization residue and dust.

12. Method according to claim 1 wherein said acid is about 10 Normal in concentration.

13. Method according to claim 1 wherein said dust and water are alternately added to said desulfurization residue in successive increments with agitation, and thereafter said acid is added thereto.

14. Method according to claim 1 wherein said desulfurization residue is in the form of a water-containing sludge and said dust is added thereto in successive increments with agitation, and thereafter said acid is added thereto.

15. Method according to claim 1 wherein the pH is adjusted by adding said acid to the premixed mass of said desulfurization residue, dust and water, in successive increments with agitation.

16. Method according to claim 1 wherein the pH is adjusted by adding sulfuric acid in an amount of about 12 to 20% by weight $H_2SO_4$ based on the combined weight of said desulfurization residue and dust.

17. Method according to claim 1 wherein the pH is adjusted by adding phosphoric acid in an amount of about 2 to 7% by weight $H_3PO_4$ based on the combined weight of said desulfurization residue and dust.

18. Method according to claim 1 wherein the pH adjusted mass is formed into a shaped article prior to said drying.

19. Method according to claim 1 for chemical fixation of industrial desulfurization residues which consists essentially of:

intimately admixing a flue gas desulfurization sludge containing calcium and sulfur constituents, which results from treatment of sulfur constituent containing gaseous effluent of basic manufacturing processes with alkaline material correspondingly to remove such sulfur constituents from such gaseous effluent, with an alkaline calcium and silicate containing cement kiln dust in the presence of sufficient water to form a mixed solids alkaline mass of workable consistency in which the desulfurization sludge and kiln dust are in the weight ratio range of about 80:20 to 50:50, adjusting the pH of the resulting alkaline mass to a value in the acid range of from below 7 down to about 5 by adding to the mass in successive increments with agitation an acid selected from the group consisting of sulfuric acid and phosphoric acid, forming the pH adjusted mass into a shaped article, and drying the pH adjusted shaped article to constant weight to produce an enviornmentally stable and leach-resistant hardened solid cement-like product.

20. Method according to claim 19 wherein said drying is carried out by ambient air drying for about 1 to 2 weeks.

21. Method according to claim 20 wherein said dust and water are alternately added to said desulfurization residue in successive increments with agitation, and the pH is adjusted by adding said acid to the resulting mass in successive increments with agitation.

22. Method according to claim 20 wherein said desulfurization residue is in the form of a water-containing sludge, and said dust and acid are alternately added thereto in successive increments with agitation to form and adjust the pH of the mass incrementally.

23. Method according to claim 20 wherein said desulfurization residue and dust are present in the weight ratio of about 50:50, and the pH is adjusted by adding sulfuric acid in an amount of about 12 to 20% by weight $H_2SO_4$ based on the combined weight of said desulfurization residue and dust.

24. Method according to claim 20 wherein said desulfurization residue and dust are present in the weight ratio of about 50:50, and the pH is adjusted by adding phosphoric acid in an amount of about 2 to 7% by weight $H_3PO_4$ based on the combined weight of said desulfurization residue and dust.

25. Product produced according to the method of claim 1.

26. Product produced according to the method of claim 2.

27. Product produced according to the method of claim 3.

28. Product produced according to the method of claim 4.

29. Product produced according to the method of claim 5.

30. Product produced according to the method of claim 8.

31. Product produced according to the method of claim 9.

32. Product produced according to the method of claim 18.

33. Product produced according to the method of claim 19.

34. Product produced according to the method of claim 23.

35. Product produced according to the method of claim 24.

* * * * *